United States Patent
Xie et al.

(10) Patent No.: US 12,407,508 B2
(45) Date of Patent: Sep. 2, 2025

(54) TRAFFIC ACCIDENT FORENSICS METHOD BASED ON BLOCKCHAIN

(71) Applicant: Hangzhou Normal University, Hangzhou (CN)

(72) Inventors: Qi Xie, Hangzhou (CN); Xiumei Li, Hangzhou (CN); Zixuan Ding, Hangzhou (CN); Bin Hu, Hangzhou (CN); Xiao Tan, Hangzhou (CN)

(73) Assignee: Hangzhou Normal University, Hangzhou (CN)

( * ) Notice: Subject to any disclaimer, the term of this patent is extended or adjusted under 35 U.S.C. 154(b) by 262 days.

(21) Appl. No.: 18/363,040

(22) Filed: Aug. 1, 2023

(65) Prior Publication Data
US 2024/0056299 A1 Feb. 15, 2024

(30) Foreign Application Priority Data

Aug. 3, 2022 (CN) .......................... 202210928554.2

(51) Int. Cl.
*H04L 9/30* (2006.01)
*G06Q 50/26* (2024.01)
*H04L 9/00* (2022.01)

(52) U.S. Cl.
CPC .......... *H04L 9/3066* (2013.01); *G06Q 50/265* (2013.01); *H04L 9/50* (2022.05)

(58) Field of Classification Search
CPC . G06Q 50/265; H04L 2209/84; H04L 9/0869; H04L 9/3066; H04L 9/3239; H04L 9/3247; H04L 9/50
See application file for complete search history.

(56) References Cited

U.S. PATENT DOCUMENTS

| | | | |
|---|---|---|---|
| 7,359,821 B1* | 4/2008 | Smith | G01L 5/0052 702/113 |
| 9,665,995 B2* | 5/2017 | Chowdhury | G08G 1/0112 |
| 9,704,391 B2* | 7/2017 | Emura | G08G 1/04 |
| 10,168,703 B1* | 1/2019 | Konrardy | G08G 1/148 |
| 10,246,037 B1* | 4/2019 | Shea | G07C 5/008 |
| 10,521,780 B1* | 12/2019 | Hopkins, III | G06Q 20/3825 |
| 10,643,407 B1* | 5/2020 | Tang | G01S 13/931 |
| 10,832,699 B1* | 11/2020 | McFarland, Jr. | G06F 16/487 |
| 10,853,882 B1* | 12/2020 | Leise | G06T 5/50 |
| 11,308,800 B2* | 4/2022 | McFarland, Jr. | G10L 25/51 |

(Continued)

*Primary Examiner* — Olugbenga O Idowu
(74) *Attorney, Agent, or Firm* — Hemisphere Law, PLLC; Zhigang Ma

(57) ABSTRACT

A traffic accident forensics method based on a blockchain is provided. After a traffic accident, the method allows vehicles to carry out a mutual verification and sign a respective accident report. After one of the vehicles verifies with a road side unit, the signed accident report is submitted to the road side unit and uploaded to the blockchain, so as to record the accident report and preventing the accident report from being tampered, and an efficient mutual verification between the vehicle and the road side unit is achieved. The key parameters in the mutual verification process are encrypted based on an elliptic curve algorithm, and thus the security of the whole mutual verification process is improved. A batch verification way for signatures is designed to reduce the compute pressure of a wireless device. Vehicles use dynamic anonymity policies to protect privacy in the forensics method.

3 Claims, 2 Drawing Sheets

(56) References Cited

U.S. PATENT DOCUMENTS

| | | | |
|---|---|---|---|
| 11,341,847 B1* | 5/2022 | Beaurepaire | G08G 1/0133 |
| 11,966,994 B2* | 4/2024 | Zheng | H04L 9/32 |
| 12,205,456 B1* | 1/2025 | White | G07C 5/008 |
| 2010/0030540 A1* | 2/2010 | Choi | G01S 5/0027 |
| | | | 342/357.31 |
| 2010/0106417 A1* | 4/2010 | Bauchot | G07C 5/085 |
| | | | 701/469 |
| 2012/0095646 A1* | 4/2012 | Ghazarian | G01S 19/17 |
| | | | 340/905 |
| 2013/0086109 A1* | 4/2013 | Huang | G06F 16/487 |
| | | | 707/E17.014 |
| 2014/0176347 A1* | 6/2014 | Kim | G08G 1/096791 |
| | | | 340/907 |
| 2018/0332364 A1* | 11/2018 | Sim | H04N 21/84 |
| 2020/0034945 A1* | 1/2020 | Soundararajan | H04L 9/3271 |
| 2020/0219336 A1* | 7/2020 | Huffman | G08G 1/0129 |
| 2020/0226853 A1* | 7/2020 | Ahmed | H04L 9/0618 |
| 2021/0136572 A1* | 5/2021 | Ingraham | H04W 12/069 |
| 2021/0216949 A1* | 7/2021 | Nordmann | G06Q 20/36 |
| 2022/0169287 A1* | 6/2022 | Beaurepaire | G01C 21/3492 |
| 2022/0309602 A1* | 9/2022 | Okabe | G06T 7/0008 |
| 2022/0335535 A1* | 10/2022 | Li | G08G 1/0133 |

* cited by examiner

TRAFFIC ACCIDENT FORENSICS METHOD BASED ON BLOCKCHAIN

TECHNICAL FIELD

The disclosure relates to the field of information security technology, in particular to a traffic accident forensics method based on a blockchain.

BACKGROUND

With the help of the new generation of information and communication technology, the Internet of vehicles realizes the connection between vehicles or between vehicles and other entities, improves the overall intelligent driving level of vehicles, provides users with a safe, comfortable, intelligent, and efficient driving experience and traffic services, improves the efficiency of traffic operation, and improves the intelligent level of social traffic services. Blockchain technology has the characteristics of decentralization, non-tampering and non-forgery, and the use of blockchain for the storage of vehicle accident reports can ensure the security and tamper-proof of the vehicle accident reports.

The disclosure provides a traffic accident forensics method based on a blockchain, after an accident occurs, vehicles provide information such as images or videos recorded in a respective driving recorder to each other. If each party of drivers of the vehicles agrees with a respective accident information report provided by the other party, the drivers sign the accident information reports and aggregate two signatures into one signature. Finally, one of the vehicles carries out an identity verification with a road side unit (also abbreviated as RSU, and which generally is a communication gateway deployed on the roadside), and the road side unit carries out batch verification on the identities of the vehicles and the signature of the accident information report. After the batch verification passes, the road side unit signs key parameters, and then accident information is generated into a block and uploaded to the blockchain. After that, owners of the vehicles can go to a third-party insurance company or a traffic management bureau for follow-up treatment of the accident within a limited date. With the help of the Internet of vehicles, efficient accident forensics can be achieved to facilitate the follow-up treatment, thereby avoiding impacts on normal traffic and avoiding secondary accidents.

SUMMARY

A purpose of the disclosure is to provide a traffic accident forensics method based on a blockchain. The disclosure is used to solve a problem of accident report negotiation between accident parties in a current scenario of the Internet of vehicles. When multiple vehicles on the road are involved in traffic accidents, video or photos are respectively provided as accident information and uploaded to the blockchain to facilitate traffic police law enforcement and insurance company claims settlement.

After a traffic accident, vehicles carry out verification to each other and sign a respective accident report. After one of the vehicles verifies with a road side unit, the signed accident report is submitted to the road side unit and uploaded to the blockchain based on blockchain technology, so as to record the accident report and preventing the accident report from being tampered, and efficient mutual verification between the vehicle and the road side unit is achieved. The key parameters in the mutual verification process are encrypted based on an elliptic curve algorithm, and thus the security of the whole mutual verification process is improved. A batch verification way for signatures is provided to reduce the compute pressure of a wireless device.

After a traffic accident occurs, vehicles mutually verify each other and sign a respective accident report, then the road side unit uploads the accident information to the blockchain.

The traffic accident forensics method based on the blockchain includes following steps.

Step S1, initialization of a trust authority: selecting, by the trust authority, an elliptic curve $E(\bullet)$ with a generator P, a secure one-way Hash function $h(\bullet)$, a fuzzy extraction function $Gen(\bullet)$, and a recovery function $Rep(\bullet)$; and selecting random numbers $(SK_{TA}, K_{TA})$ as a long-term private key of the trust authority, and determining a point multiplication result based on an elliptic curve algorithm as a public key $PK_{TA}=SK_{TA} \cdot P$ of the trust authority; and publishing parameters $\{P, E(\bullet), h(\bullet), Gen(\bullet), Rep(\bullet), PK_{TA}\}$.

Step S2, submitting, by vehicles and road side units, registration requests to the trust authority; after identities of the vehicles and the road side units are verified by the trust authority, feeding, by the trust authority, registration information of the vehicles and registration information of the road side units to the vehicles and the road side units respectively, and storing the registration information of the vehicles and the registration information of the road side devices in corresponding on-board circuits of the vehicles and corresponding storage circuits of the road side units, respectively; wherein for a vehicle Vi of the vehicles and a road side unit of the road side units, the step S2 further includes:

sub-step S2.1, selecting, by the vehicle Vi, a random number $SK_{Vi}$ as a long-term private key of the vehicle Vi, and determining a point multiplication result based on the elliptic curve algorithm as a public key $PK_{Vi}=SK_{Vi} \cdot P$ of the vehicle Vi; sending, by the vehicle Vi, an unique identity number $VID_i$ (such as an engine number) of the vehicle Vi, the public key $PK_{Vi}$ of the vehicle Vi, and vehicle appearance information $VaI_i$ of the vehicle Vi to the trust authority through a secure message channel;

sub-step S2.2, after the identity number $VID_i$ of the vehicle Vi is verified by the trust authority, calculating, by the trust authority, an identity-verification parameter $b_i$ of the vehicle Vi, selecting a random number $r_i$ and a random number $a_i$, calculating a point multiplication result $A_i=a_i \cdot P$ based on the elliptic curve algorithm of the random number $a_i$, determining a pseudonym $PID_i=E_{KTA}(VID_i, VaI_i, r_i)$ of the vehicle Vi, $E_{KTA}(VID_i, VaI_i, r_i)$ representing a function that uses the long-term private key $K_{TA}$ to encrypt the identity number $VID_i$, the vehicle appearance information $VaI_i$, and the random number $r_i$ based on the elliptic curve algorithm; then returning parameters $\{PID_i, A_i, b_i, PK_{TA}, r_i\}$ to the vehicle Vi, where the identity-verification parameter $b_i$ is expressed as $b_i=h(PID_i\|PK_{Vi}\|A_i)*SK_{TA}+a_i$;

sub-step S2.3, verifying, by the vehicle Vi, correctness of a point multiplication result $b_i \cdot P=h(PID_i\|PK_{Vi}\|A_i) \cdot PK_{TA}+A_i$ of the identity-verification parameter $b_i$ based on the elliptic curve algorithm; when the point multiplication result $b_i \cdot P=h(PID_i\|PK_{Vi}\|A_i) \cdot PK_{TA}+A_i$ is correct, inputting, by a driver of the vehicle Vi, biological information $Bio_i$ of the driver of the vehicle Vi; calculating, by the vehicle Vi, a biological key $\sigma_i$ and a key recovery parameter $\tau_i$ using $(\sigma_i, \tau_i)=Gen(Bio_i)$, calculating a login-verification parameter $V_i=h(\sigma_i\|VaI_i)$, $S_{i1}=b_i\oplus h(\sigma_i\|V_i)$ used to encrypt and store the identity-verification parameter $b_i$, $S_{i2}=SK_{Vi}\oplus h(V_i\|\sigma_i)$ used to encrypt and store the long-term private key $SK_{Vi}$, and $S_{i3}=r_i\oplus h(VID_i\|\sigma_i)$ used to encrypt and store the random number $r_i$; and storing, by the vehicle Vi, the registration information $\{P, V_i, S_{i1}, S_{i2}, S_{i3}, A_i, PK_{Vi}, PK_{TA}, PID_i, \text{Rep}(\cdot), VaI_i, \tau_i\}$ of the vehicle $V_i$ in the on-board circuit of the vehicle $V_i$;

sub-step S2.4, selecting, by the trust authority, an identity mark $RID_t$, a private key $SK_{Rt}$, and a random number $z_t$ for the road side unit; calculating a public key $PK_{Rt}=SK_{Rt}\cdot P$ of the road side unit based on the elliptic curve algorithm, calculating a point multiplication result $Z_t=z_t\cdot P$ of the random number $z_t$ based on the elliptic curve algorithm, and calculating an identity-verification parameter $y_t=h(RID_t\|PK_{Rt}\|Z_t)*SK_{TA}+z_t$ of the road side unit; and sending, by the trust authority, the registration information $\{RID_t, y_t, Z_t, SK_{Rt}, PK_{Rt}, PK_{TA}\}$ of the road side unit to the road side unit through the secure message channel; and sub-step S2.5, after the road side unit receives the registration information $\{RID_t, y_t, Z_t, SK_{Rt}, PK_{Rt}, PK_{TA}\}$, verifying correctness of a point multiplication result $y_t\cdot P=h(RID_t\|PK_{Rt}\|Z_t)*PK_{TA}+Z_t$ of the identity-verification parameter $y_t$ based on the elliptic curve algorithm; when the point multiplication result $y_t\cdot P$ is wrong, resubmitting a registration request by the road side unit, otherwise storing the registration information $\{RID_t, y_t, Z_t, SK_{Rt}, PK_{Rt}, PK_{TA}\}$ to the storage circuit of the road side unit.

Step S3, after an accident occurs between the vehicle $V_i$ and a vehicle Vj, performing, by the vehicle Vi and the vehicle Vj, processes of mutually confirming accident information and signing accident reports, and the processes including:

sub-step S3.1, inputting, by a driver of the vehicle Vi, the biological information $Bio_i$ to the vehicle Vi; recovering, by the vehicle Vi, the biological key $\sigma_i=\text{Rep}(Bio_i, \tau_i)$; calculating the login-verification parameter $V_i=h(\sigma_i\|VaI_i)$, and verifying correctness of the login-verification parameter $V_i=h(\sigma_i\|VaI_i)$; when the login-verification parameter $V_i=h(\sigma_i\|VaI_i)$ is correct, determining that identity verification of the driver is successful; then decrypting, by the vehicle Vi, the identity-verification parameter $b_i=S_{i1}\oplus h(\sigma_i\|V_i)$ and the long-term private key $SK_{Vi}=S_{i2}\oplus h(V_i\|\sigma_i)$, and generating, by the vehicle Vi, a random number $d_{i1}$, a random number $d_{i2}$, a time stamp $T_1$, and accident information D1 including an image or a video;

calculating a point multiplication result $D_{i1}=d_{i1}\cdot P$ of the random number $d_{i1}$, a point multiplication result $D_{i2}=d_{i1}\cdot P$ of the random number $d_{i2}$, and an accident report verification parameter $c_{i1}=SK_{Vi}+h(D1\|D_{i1}\|D_{i2}\|T_1\|PID_i\|VaI_i)*d_{i1}$ based on the elliptic curve algorithm; and sending, by the vehicle Vi, an accident report $M_{i1}=\{D1, b_i, PID_i, A_i, D_{i1}, D_{i2}, PK_{Vi}, c_{i1}, VaI_i, T_1\}$ to the vehicle Vj;

sub-step 3.2, inputting, a driver of the vehicle Vj, biological information $Bio_j$ of the driver of the vehicle Vj to the vehicle Vj, recovering, by the vehicle Vj, a biological key $\sigma_j=\text{Rep}(Bio_j, \tau_j)$, calculating a login-verification parameter $V_j=h(\sigma_j\|VaI_j)$ of the vehicle Vj, and verifying correctness of the login-verification parameter $V_j=h(\sigma_j\|VaI_j)$; when the login-verification parameter $V_j=h(\sigma_j\|VaI_j)$ is correct, determining that identity verification of the driver is successful; then decrypting, by the vehicle Vj, an identity-verification parameter $b_j=S_{j1}\oplus h(\sigma_j\|V_j)$ of the vehicle Vj and a long-term private key $SK_{Vj}=S_{j2}\oplus h(V_j\|\sigma_j)$ of the vehicle Vj, and generating, by the vehicle Vj, a random number $d_{j1}$, a random number $d_{j2}$, a time stamp $T_2$, and accident information D2 including an image or a video;

calculating a point multiplication result $D_{j1}=d_{j1}\cdot P$ of the random number $d_{j1}$ based on the elliptic curve algorithm, calculating a point multiplication result $D_{j2}=d_{j2}\cdot P$ of the random number $d_{j2}$ based on the elliptic curve algorithm, and calculating an accident report verification parameter $c_{j1}=SK_{Vj}+h(D2\|D_{j1}\|D_{j2}\|T_1\|PID_j\|VaI_j)*d_{j1}$; and sending, by the vehicle Vj, an accident report $M_{j1}=\{D2, b_j, PID_j, A_j, D_{j1}, D_{j2}, PK_{Vj}, c_{j1}, VaI_j, T_2\}$ to the vehicle Vi;

sub-step 3.3, after the vehicle Vi receives the accident report $M_{j1}$ from the vehicle Vj, performing, by the vehicle Vi, first verifications on freshness of the time stamp $T_2$, correctness of a point multiplication result $b_j\cdot P=h(PID_j\|PK_{Vj}\|A_j)*PK_{TA}+A_j$ of the identity-verification parameter $b_j$ based on the elliptic curve algorithm, and correctness of a point multiplication result $c_{j1}\cdot P=PK_{Vj}+h(D2\|D_{j1}\|D_{j2}\|PID_j\|VaI_j)*D_{j1}$ of the accident report verification parameter $c_{j1}$ based on the elliptic curve algorithm; after the first verifications are passed, confirming, by the vehicle Vi, the accident information D2, when the driver of the vehicle Vi agrees that the accident information D2 sent by the accident vehicle Vj is reasonable, signing the accident information D2 by:

calculating, by the vehicle Vi, a point addition result $D_{ij}=D_{i2}+D_{j2}$ of the point multiplication result $D_{i2}$ and the point multiplication result $D_{j2}$ based on the elliptic curve algorithm, and calculating, by the vehicle Vi, an accident report verification parameter $c_{i2}=SK_{Vi}+h(D1\|D2\|D_{ij}\|T_1\|PID_i\|T_2\|PID_j\|VaI_i\|VaI_j)*d_{i2}$; and sending, by the vehicle Vi, an signed accident report $M_{i2}=\{c_{i2}, PID_i, VaI_i, PID_j\}$ to the vehicle Vj;

sub-step S3.4, after the vehicle Vj receives the accident report $M_{i1}$ from the vehicle Vi, performing, by the vehicle Vj, second verifications on freshness of the time stamp $T_1$, correctness of a point multiplication result $b_i\cdot P=h(PID_i\|PK_{Vi}\|A_i)*PK_{TA}+A_i$ of the identity-verification parameter $b_i$ based on the elliptic curve algorithm, and correctness of a point multiplication result $c_i\cdot P=PK_{Vi}+h(D1\|D_{i1}\|D_{i2}\|T_1\|PID_i\|VaI_i)*D_{i1}$ of the accident report verification parameter $c_{i1}$ based on the elliptic curve algorithm; after the second verifications are passed, confirming, by the vehicle Vj, the accident information D1; when the driver of the vehicle Vj agrees that the accident information D1 sent by the accident vehicle Vi is reasonable, signing the accident information D1 by:

calculating, by the vehicle Vj, the point addition result $D_{ij}=D_{i2}+D_{j2}$ of the point multiplication result $D_{i2}$ and the point multiplication result $D_{j2}$ based on the elliptic curve algorithm, and calculating, by the vehicle Vj, an accident report verification parameter $c_{j2}=SK_{Vj}+h(D1\|D2\|D_{ij}\|T_1\|PID_i\|T_2\|PID_j\|VaI_i\|VaI_j)*d_{j2}$; and sending, by the vehicle Vj, an signed accident report $M_{j2}=\{c_{i2}, PID_i, VaI_i, PID_j\}$ to the vehicle Vi;

sub-step 3.5, after the vehicle $V_i$ receives the signed accident report $M_{j2}$ from the vehicle Vj, calculating, by the vehicle $V_i$, a sum $c_{ij}=c_{j2}+c_{i2}$ of the accident report verification parameter $c_{j2}$ and the accident report verification parameter $c_{i2}$, then verifying correctness of a point multiplication result $c_{ij} \cdot P = PK_{Vj} + PK_{Vi} + h(D1\|D2\|D_{ij}\|T_1\|PID_i\|T_2\|PID_j\|VaI_i\|VaI_j)D_{ij}$ of the sum $c_{ij}$ based on the elliptic curve algorithm, and when the point multiplication result $c_{ij} \cdot P$ is correct, determining that the corresponding accident reports are signed by the vehicle Vi and the vehicle Vj; and sub-step 3.6, after the vehicle Vj receives the signed accident report $M_{i2}$ from the vehicle Vj, calculating, by the vehicle Vj, the sum $c_{ij} = c_{j2} + c_{i2}$ of the accident report verification parameter $c_{j2}$ and the accident report verification parameter $c_{i2}$, then verifying correctness of the point multiplication result $c_{ij} \cdot P = PK_{Vj} + PK_{Vi} + h(D1\|D2\|D_{ij}\|T_1\|PID_i\|T_2\|PID_j\|VaI_i\|VaI_j)D_{ij}$ of the sum $c_{ij}$ based on the elliptic curve algorithm, and when the point multiplication result $c_{ij} \cdot P$ is correct, determining that the corresponding accident reports are signed by the vehicle Vi and the vehicle Vj.

Step S4, uploading, by the road side unit, accident information Tx to the blockchain after the road side unit identifies the vehicle Vi and the vehicle Vj; and wherein the uploading includes:

sub-step S4.1, sending, by the vehicle Vi, a message $M1 = \{PID_i, b_i, PK_{Vi}, A_i, PID_j, b_j, PK_{vj}, A_j\}$ to the road side unit, and the message M1 including a parameter set;

sub-step S4.2, after the road side unit receives the message M1, verifying, by the road side unit, correctness of a point multiplication result $(b_i + b_j) \cdot P = (h(PID_i\|PK_{vi}\|A_i) + h(PID_j\|PK_{vj}\|A_j)) PK_{TA} + (A_i + A_j)$ of a sum of the identity-verification parameter $b_i$ and the identity-verification parameter $b_j$ based on the elliptic curve algorithm; and when the point multiplication result $(b_i + b_j) \cdot P$ is correct, sending, by the road side unit, a message $M2 = \{RID_t, y_t, Z_t, PK_{Rt}\}$ to the vehicle Vi;

sub-step S4.3, after the vehicle Vi receives the message M2, verifying, by the vehicle Vi, correctness of a point multiplication result $y_t \cdot P = h(RID_t\|PK_{Rt}\|Z_t)PK_{TA} + Z_t$ of the identity-verification parameter $y_t$ of the road side unit based on the elliptic curve algorithm; and when the point multiplication result $y_t \cdot P$ is correct, sending, by the vehicle Vi, a message $M3 = \{c_{ij}, PK_{vi}, PK_{vj}, D1, D2, D_{ij}, T_1, PID_i, T_2, PID_j, VaI_i, VaI_j\}$ to the road side unit; and sub-step S4.4, after the road side unit receives the message M3, verifying, by the road side unit, correctness of a point multiplication result $c_{ij} \cdot P = PK_{Vj} + PK_{Vi} + h(D1\|D2\|D_{ij}\|T_1\|PID_i\|T_2\|PID_j\|VaI_i\|VaI_j)D_{ij}$ of the sum $c_{ij}$ based on the elliptic curve algorithm; and when the point multiplication result $c_{ij} \cdot P$ is correct, selecting, by the road side unit, a random number $d_t$ and calculating a point multiplication result $D_t = d_t \cdot P$ of the random number $d_t$ based on the elliptic curve algorithm, generating a signature parameter $c_t = SK_{Rt} + h(c_{ij}\|T_3\|D_t)d_t$ by the road side unit, $T_3$ of the signature parameter $c_t$ representing a time stamp, and unloading, by the road side unit, the accident information $Tx = \{c_{ij}, PK_{vi}, PK_{vj}, D1, D2, Dij, T_1, PID_i, T_2, PID_j, VaI_i, VaI_j, RID_t, PK_{Rt}, T_3, c_t, D_t\}$ to the blockchain.

Step S5, updating, by the vehicle $V_i$, a temporary identity to prevent identity tracking attacks, and wherein the updating includes:

sub-step S5.1, inputting, by the driver of the vehicle Vi, the biological information $Bio_i$ of the driver of the vehicle Vi to the vehicle Vi; recovering, by the vehicle Vi, the biological key $\sigma_i = Rep(Bio_i, \tau_i)$, calculating the login-verification parameter $V_i = h(\sigma_i\|VaI_i)$, and verifying the correctness of the login-verification parameter $V_i = h(\sigma_i\|VaI_i)$; and when $V_i \neq h(\sigma_i\|VaI_i)$, determining that the login-verification parameter $V_i = h(\sigma_i\|VaI_i)$ is wrong, otherwise decrypting, by the vehicle Vi, the random number $r_i = S_{i3} \oplus h(VID_i\|\sigma_i)$;

sub-step 5.2, reselecting, by the vehicle Vi, a random number $SK_{Vi}^*$ as a private key; and generating a time stamp $T_4$, calculating a point multiplication result $PK_{Vi}^* = SK_{Vi}^* \cdot P$ of the random number $SK_{Vi}^*$ based on the elliptic curve algorithm, and the point multiplication result $PK_{Vi}^*$ representing a public key; encrypting, by the vehicle Vi, a message $M_1 = E_{r_i}(VID_i, PK_{Vi}^*, PID_i, T_4)$, and sending, by the vehicle Vi, a first message set $\{PID_i, M_1, T_4\}$ to the trust authority for an update request;

sub-step 5.3, after the trust authority receives the update request, verifying, by the trust authority, freshness of the time stamp $T_4$, when the freshness of the time stamp $T_4$ passes a verification of the trust authority, decrypting, by the trust authority, the message $M_1$ by $(VID_i, VaI_i, r_i) = D_{K_{TA}}(PID_i)$ and $(VID_i^*, PK_{Vi}^*, PID_i^*, T_4^*) = D_{r_i}(M_1)$; verifying, by the trust authority, equations $VID_i^* = VID_i$, $PID_i^* = PID_i$, and $T_4^* = T_4$; when the equations hold, generating, by the trust authority, a random number $r_i^*$ and a random number $a_i^*$; calculating, by the trust authority, a point multiplication result $A_i^* = a_i^* \cdot P$ of the random number $a_i^*$ based on the elliptic curve algorithm; calculating, by the trust authority, a pseudonym $PID_i^* = E_{K_{TA}}(VID_i\|VaI_i\|r_i^*)$ of the vehicle Vi; calculating, by the trust authority, an identity-verification parameter $b_i^* = h(PID_i^*\|PK_{Vi}^*\|A_i^*) \cdot SK_{TA} + a_i^*$ of the vehicle Vi; generating, by the trust authority, a time stamp $T_5$; calculating a message $M2 = E_{r_i}(VID_i, A_i^*, PID_i^*, b_i^*, r_i^*, T_5)$, and sending a second message set $\{PID_i, M_2, T_5\}$ to the vehicle Vi; and sub-step S5.4, after the vehicle Vi receives the second message set $\{PID_i, M_2, T_5\}$, verifying, by the vehicle Vi, freshness of the time stamp $T_5$; when the freshness of the time stamp $T_5$ passes a verification of the vehicle Vi, decrypting, by the vehicle Vi, the message $M_2$ by $(VID_i^{**}, A_i^*, PID_i^*, b_i^*, T_5^*) = D_{r_i}(M_2)$; verifying, by the vehicle Vi, correctness of a point multiplication result $b_i^* \cdot P = h(PID_i^*\|PK_{Vi}^*\|A_i^*) \cdot PK_{TA} + A_i^*$ of the identity-verification parameter $b_i^*$ based on the elliptic curve algorithm; when the point multiplication result $b_i^* \cdot P$ is correct, $VID_i^{**} = VID_i$, and $T_5^* = T_5$, calculating, by the vehicle Vi, a login-verification parameter $V_i^* = h(\sigma_i\|VaI_i)$, $S_{i1}^* = b_i^* \oplus h(\sigma_i\|V_i)$ used to encrypt and store the identity-verification parameter $b_i^*$, $S_{i2}^* = SK_{Vi}^* \oplus h(V_i\|\sigma_i)$ used to encrypt and store the long-term private key $SK_{Vi}^*$, and $S_{i3}^* = r_i^* \oplus h(VID_i\|\sigma_i)$ used to encrypt and store the random number $r_i^*$; and replacing, by the vehicle Vi, the registration information $\{P, V_i, S_{i1}, S_{i2}, S_{i3}, A_i, PK_{Vi}, PK_{TA}, PID_i, Rep(\cdot), VaI_i, \tau_i\}$ of the vehicle Vi stored in the on-board circuit with $\{P, V_i, S_{i1}^*, S_{i2}^*, S_{i3}^*, A_i^*, PK_{Vi}^*, PK_{TA}, PID_i^*, Rep(\cdot), VaI_i, \tau_i\}$.

A time stamp is verified by $|T_n' - T_n| \leq \Delta T$, where $T_n$ represents a time stamp contained in a target message, and $T_n'$ represents a current time stamp when a device receives the target message, and $\Delta T$ represents a preset threshold time allowed in a communication process; when a time difference between $T_n$ and $T_n'$ exceeds the preset threshold time, verification of the time stamp is terminated; when the time difference between $T_n$ and $T_n'$ does not exceeds the preset threshold time, a next step to the verification of the time stamp is performed.

The accident report $M_{i1}$, the accident report $M_{j1}$, the signed accident report $M_{i2}$, the signed accident report $M_{j2}$, the message $M_1$, the message $M_2$, and the message $M_3$ are transmitted within a common channel.

Compared with the related art, the disclosure has following effects.

After the accident, the verification of the accident report agreement between the vehicles is mutual, and the verification between the vehicle and the road side unit is also mutual, so as to ensure the reliability and identity traceability of the verification of both parties.

The disclosure pays attention to the privacy protection of vehicles. The true identity of a vehicle can only be obtained by the vehicle itself and the trust authority. During interaction with other entities, the vehicle uses a temporary identity to protect privacy.

Vehicle records and messages cannot be forged, tampered with, or maliciously traced. The disclosure is designed based on the blockchain and the temporary identity, and the disclosure verifies the integrity of messages during a process of message generation and upload, thereby to ensure the aforementioned properties.

When multiple vehicles are involved in an accident, any one vehicle can carry out batch verifications on other vehicles, and the road side unit can also carry out batch verification on the identities of vehicles and signatures of accident information of all vehicles.

Elliptic curves are used, the elliptic curve cryptosystem has advantages such as short keys, high strength, few parameters, fast digital signatures, and small computational data, making it particularly suitable for devices with limited computing and storage resources.

DETAILED DESCRIPTION OF EMBODIMENTS

Figure 1:
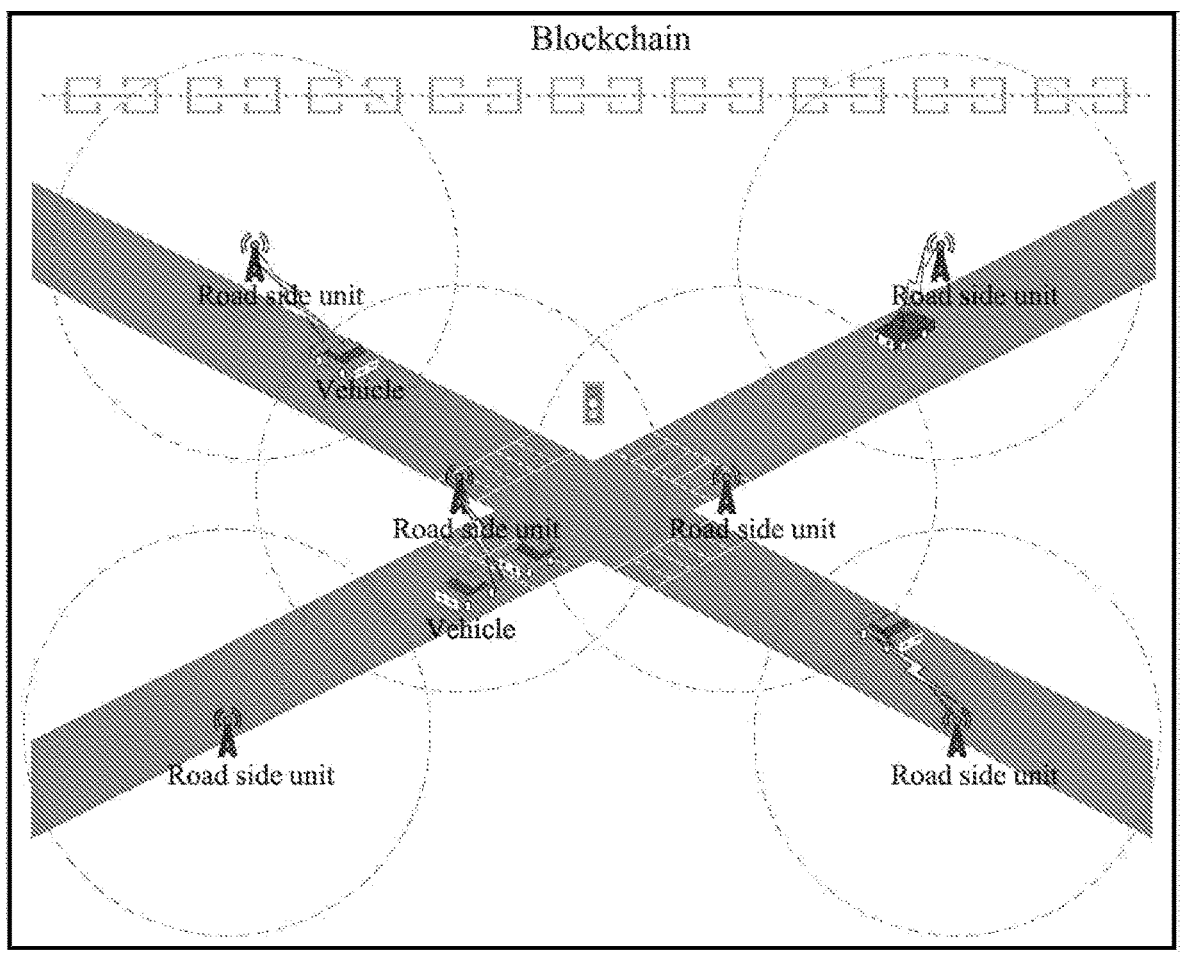
FIG. 1 illustrates a relationship diagram among vehicles, road side units, and a blockchain.

As shown in FIG. 1, a traffic accident forensics method based on a blockchain is implemented based on vehicles, a trust authority and road side units and a blockchain. An embedded control unit of Internet of vehicles is installed in each vehicle, and the embedded control unit of Internet of vehicles is used to control and track a vehicle status, an on-board intelligent operating system realizes an interaction between a driver and the vehicle, and a remote communication terminal Tbox provides functions of networking and information upload. Each of the road side unit is equipped with an encryption chip and a wireless communication system. The communication between the vehicle and the road side unit is based on the cellular communication technology used in the Internet of vehicles. An on-board circuit of the vehicle and a storage circuit of the road side unit are configured to store information, and the vehicle and road side unit are first registered in the trust authority. Multiple road side units jointly maintain a blockchain. After a vehicle accident occurs, the accident vehicles first verify to each other and sign corresponding accident reports. Then, one of the vehicles verifies with the road side unit, and the road side unit uploads resultant accident information to the blockchain.

Figure 2:
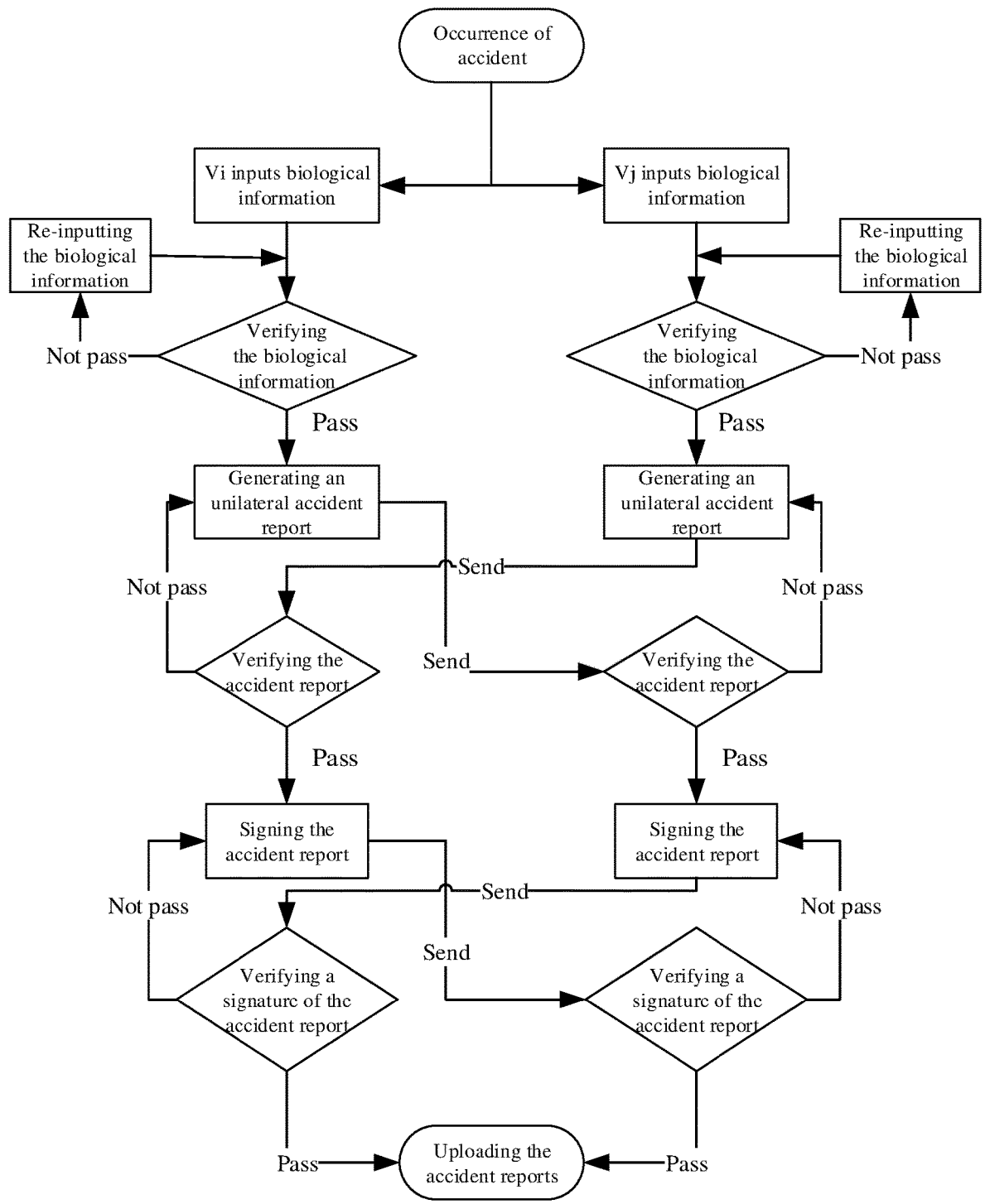
FIG. 2 illustrates a flowchart of mutual confirmation and signing accident when an accident occurs between two vehicles.

As shown in FIG. 2, a process of mutual confirmation of an accident between vehicles and signing accident reports is as follows.

After the accident, the driver of the accident vehicle P inputs his/her biological information, and the vehicle P verifies the biological information. If the biological information is correct, the identity verification of the driver is successful. Otherwise, the vehicle P requires the driver to re-verify the biological information. The vehicle P generates an accident report and send it to the accident vehicle Vj.

At the same time, the driver of the accident vehicle Vj inputs his/her biological information, and the vehicle Vj verifies the biological information. If the biological information is correct, the identity verification of the driver is successful. Otherwise, the vehicle Vj requires the driver to re-verify the biological information. The vehicle Vj generates an accident report and send it to the vehicle Vi. Both vehicles Vi and Vj verify a respective received report and verify its impartiality. If both vehicles Vi and Vj verify the respective received report, the respective received report is signed. Otherwise, it is required to regenerate new reports. Both vehicles Vi and Vj will send a respective signed report to each other, verify and upload the respective signed report to the road side unit.

Refer to two vehicle accident for the handling of a multiple vehicle accident (i.e., three or more vehicles occur an accident), multiple accident vehicle groups are formed based on the fault of the accident, and each group uploads accident information separately. Due to the complexity of the multiple vehicle accident, a complex accident usually handled directly by traffic police on site. The disclosure is particularly suitable for simple traffic accidents, facilitating rapid handling in case of simple accidents, and avoiding the impact of simple accidents on traffic.

What is claimed is:

1. A traffic accident forensics method based on a blockchain, comprising:

step S1, initialization of a trust authority: selecting, by the trust authority, an elliptic curve E(•) with a generator P, a secure one-way Hash function h(•), a fuzzy extraction function Gen(•), and a recovery function Rep(•); and selecting random numbers $(SK_{TA}, K_{TA})$ as a long-term private key of the trust authority, and determining a point multiplication result based on an elliptic curve algorithm as a public key $PK_{TA}=SK_{TA} \cdot P$ of the trust authority; and publishing parameters $\{P, E(•), h(•), Gen(•), Rep(•), PK_{TA}\}$;

step S2, submitting, by vehicles and road side units, registration requests to the trust authority; after identities of the vehicles and the road side units are verified by the trust authority, feeding, by the trust authority, registration information of the vehicles and registration information of the road side units to the vehicles and the road side units respectively, and storing the registration information of the vehicles and the registration information of the road side devices in corresponding on-board circuits of the vehicles and corresponding storage circuits of the road side units, respectively; wherein for a vehicle Vi of the vehicles and a road side unit of the road side units, the step S2 further comprises:

sub-step S2.1, selecting, by the vehicle Vi, a random number $SK_{Vi}$ as a long-term private key of the vehicle Vi, and determining a point multiplication result based on the elliptic curve algorithm as a public key $PK_{Vi}=SK_{Vi}\cdot P$ of the vehicle Vi; sending, by the vehicle Vi, an identity number $VID_i$ of the vehicle Vi, the public key $PK_{Vi}$ of the vehicle Vi, and vehicle appearance information $VaI_i$ of the vehicle Vi to the trust authority through a secure message channel;

sub-step S2.2, after the identity number $VID_i$ of the vehicle Vi is verified by the trust authority, calculating, by the trust authority, an identity-verification parameter $b_i$ of the vehicle Vi, selecting a random number $r_i$ and a random number $a_i$, calculating a point multiplication result $A_i=a_i\cdot P$ based on the elliptic curve algorithm of the random number $a_i$, determining a pseudonym $PID_i=E_{KTA}(VID_i, VaI_i, r_i)$ of the vehicle Vi, $E_{KTA}(VID_i, VaI_i, r_i)$ representing a function that uses the long-term private key $K_{TA}$ to encrypt the identity number $VID_i$, the vehicle appearance information $VaI_i$, and the random number $r_i$ based on the elliptic curve algorithm; then returning parameters $\{PID_i, A_i, b_i, PK_{TA}, r_i\}$ to the vehicle Vi, where the identity-verification parameter $b_i$ is expressed as $b_i=h(PID_i\|PK_{Vi}\|A_i)*SK_{TA}+a_i$;

sub-step S2.3, verifying, by the vehicle Vi, correctness of a point multiplication result $b_i\cdot P=h(PID_i\|PK_{Vi}\|A_i)\cdot PK_{TA}+A_i$ of the identity-verification parameter $b_i$ based on the elliptic curve algorithm; when the point multiplication result $b_i\cdot P=h(PID_i\|PK_{Vi}\|A_i)\cdot PK_{TA}+A_i$ is correct, inputting, by a driver of the vehicle Vi, biological information $Bio_i$ of the driver of the vehicle Vi; calculating, by the vehicle Vi, a biological key $\sigma_i$ and a key recovery parameter $\tau_i$ using $(\sigma_i, \tau_i)=Gen(Bio_i)$, calculating a login-verification parameter $V_i=h(\sigma_i\|VaI_i)$, $S_{i1}=b_i\oplus h(\sigma_i\|V_i)$ used to encrypt and store the identity-verification parameter $b_i$, $S_{i2}=SK_{Vi}\oplus h(V_i\|\sigma_i)$ used to encrypt and store the long-term private key $SK_{Vi}$, and $S_{i3}=r_i\oplus h(VID_i\|\sigma_i)$ used to encrypt and store the random number $r_i$; and storing, by the vehicle Vi, the registration information $\{P, V_i, S_{i1}, S_{i2}, S_{i3}, A_i, PK_{Vi}, PK_{TA}, PID_i, Rep(\cdot), VaI_i, \tau_i\}$ of the vehicle Vi in the on-board circuit of the vehicle $V_i$;

sub-step S2.4, selecting, by the trust authority, an identity mark $RID_t$, a private key $SK_{Rt}$, and a random number $z_t$ for the road side unit; calculating a public key $PK_{Rt}=SK_{Rt}\cdot P$ of the road side unit based on the elliptic curve algorithm, calculating a point multiplication result $Z_t=z_t\cdot P$ of the random number $z_t$ based on the elliptic curve algorithm, and calculating an identity-verification parameter $y_t=h(RID_t\|PK_{Rt}\|Z_t)*SK_{TA}+z_t$ of the road side unit; and sending, by the trust authority, the registration information $\{RID_t, y_t, Z_t, SK_{Rt}, PK_{Rt}, PK_{TA}\}$ of the road side unit to the road side unit through the secure message channel; and sub-step S2.5, after the road side unit receives the registration information $\{RID_t, y_t, Z_t, SK_{Rt}, PK_{Rt}, PK_{TA}\}$, verifying correctness of a point multiplication result $y_t\cdot P=h(RID_t\|PK_{Rt}\|Z_t)*PK_{TA}+Z_t$ of the identity-verification parameter $y_t$ based on the elliptic curve algorithm; when the point multiplication result $y_t\cdot P$ is wrong, resubmitting a registration request by the road side unit, otherwise storing the registration information $\{RID_t, y_t, Z_t, SK_{Rt}, PK_{Rt}, PK_{TA}\}$ to the storage circuit of the road side unit;

step S3, after an accident occurs between the vehicle Vi and a vehicle Vj, performing, by the vehicle Vi and the vehicle Vj, processes of mutually confirming accident information and signing accident reports, and the processes comprising:

sub-step S3.1, inputting, by a driver of the vehicle Vi, the biological information $Bio_i$ to the vehicle Vi; recovering, by the vehicle Vi, the biological key $\sigma_i=Rep(Bio_i, \tau_i)$; calculating the login-verification parameter $V_i=h(\sigma_i\|VaI_i)$, and verifying correctness of the login-verification parameter $V_i=h(\sigma_i\|VaI_i)$; when the login-verification parameter $V_i=h(\sigma_i\|VaI_i)$ is correct, determining that identity verification of the driver is successful; then decrypting, by the vehicle Vi, the identity-verification parameter $b_i=S_{i1}\oplus h(\sigma_i\|V_i)$ and the long-term private key $SK_{Vi}=S_{i2}\oplus h(V_i\|\sigma_i)$, and generating, by the vehicle Vi, a random number $d_{i1}$, a random number $d_{i2}$, a time stamp $T_i$, and accident information D1 comprising an image or a video;

calculating a point multiplication result $D_{i1}=d_{i1}\cdot P$ of the random number $d_{i1}$, a point multiplication result $D_{i2}=d_{i2}\cdot P$ of the random number $d_{i2}$, and an accident report verification parameter $c_{i1}=SK_{Vi}+h(D1\|D_{i1}\|D_{i2}\|T_1\|PID_i\|VaI_i)*d_{i1}$ based on the elliptic curve algorithm; and sending, by the vehicle Vi, an accident report $M_{i1}=\{D1, b_i, PID_i, A_i, D_{i1}, D_{i2}, PK_{Vi}, c_{i1}, VaI_i, T_1\}$ to the vehicle V;

sub-step 3.2, inputting, a driver of the vehicle Vj, biological information $Bio_j$ of the driver of the vehicle Vj to the vehicle Vj, recovering, by the vehicle Vj, a biological key $\sigma_j=Rep(Bio_j, \tau_j)$, calculating a login-verification parameter $V_j=h(\sigma_j\|VaI_j)$ of the vehicle Vj, and verifying correctness of the login-verification parameter $V_j=h(\sigma_j\|VaI_j)$; when the login-verification parameter $V_j=h(\sigma_j\|VaI_j)$ is correct, determining that identity verification of the driver is successful; then decrypting, by the vehicle Vj, an identity-verification parameter $b_j=S_{j1}\oplus h(\sigma_j\|V_j)$ of the vehicle Vj and a long-term private key $SK_{Vj}=S_{j2}\oplus h(V_j\|\sigma_j)$ of the vehicle Vj, and generating, by the vehicle Vj, a random number $d_{j1}$, a random number $d_{j2}$, a time stamp $T_2$, and accident information D2 comprising an image or a video;

calculating a point multiplication result $D_{j1}=d_{j1}\cdot P$ of the random number $d_{j1}$ based on the elliptic curve algorithm, calculating a point multiplication result $D_{j2}=d_{j2}\cdot P$ of the random number $d_{j2}$ based on the elliptic curve algorithm, and calculating an accident report verification parameter $c_{j1}=SK_{Vj}+h(D2\|D_{j1}\|D_{j2}\|T_1\|PID_j\|VaI_j)*d_{j1}$; and sending, by the vehicle Vj, an accident report $M_{j1}=\{D2, b_j, PID_j, A_j, D_{j1}, D_{j2}, PK_{Vj}, c_{j1}, VaI_j, T_2\}$ to the vehicle Vi;

sub-step 3.3, after the vehicle Vi receives the accident report $M_{j1}$ from the vehicle Vj, performing, by the vehicle Vi, first verifications on freshness of the time stamp $T_2$, correctness of a point multiplication result $b_j\cdot P=h(PID_j\|PK_{Vj}\|A_j)*PK_{TA}+A_j$ of the identity-verification parameter $b_j$ based on the elliptic curve algorithm, and correctness of a point multiplication result $c_{j1}\cdot P=PK_{Vj}+h(D2\|D_{j1}\|D_{j2}\|T_2\|PID_j\|VaI_j)*D_{j1}$ of the accident report verification parameter $c_{j1}$ based on the elliptic curve algorithm; after the first verifications are passed, confirming, by the vehicle Vi, the accident information D2, when the driver of the vehicle Vi agrees that the accident information D2 sent by the accident vehicle Vj is reasonable, signing the accident information D2 by:

calculating, by the vehicle Vi, a point addition result $D_{ij}=D_{i2}+D_{j2}$ of the point multiplication result $D_{i2}$ and the point multiplication result $D_{j2}$ based on the elliptic curve algorithm, and calculating, by the vehicle Vi, an accident report verification parameter $c_{i2}=SK_{Vi}+h(D1\|D2\|D_{ij}\|T_1\|PID_i\|T_2\|PID_j\|VaI_i\|VaI_j)*d_{i2}$; and sending, by the vehicle Vi, an signed accident report $M_{i2}=\{c_{i2}, PID_i, VaI_i, PID_j\}$ to the vehicle Vj;

sub-step S3.4, after the vehicle Vj receives the accident report $M_{i1}$ from the vehicle Vi, performing, by the vehicle Vj, second verifications on freshness of the time stamp $T_1$, correctness of a point multiplication result $b_i \cdot P = h(PID_i\|PK_{Vi}\|A_i)*PK_{TA}+A_i$ of the identity-verification parameter $b_i$ based on the elliptic curve algorithm, and correctness of a point multiplication result $c_{i1} \cdot P = PK_{Vi}+h(D1\|D_{i1}\|D_{i2}\|T_1\|PID_i\|VaI_i)*D_{i1}$ of the accident report verification parameter $c_{i1}$ based on the elliptic curve algorithm; after the second verifications are passed, confirming, by the vehicle Vj, the accident information D1; when the driver of the vehicle Vj agrees that the accident information D1 sent by the accident vehicle $V_i$ is reasonable, signing the accident information D1 by:

calculating, by the vehicle Vj, the point addition result $D_{ij}=D_{i2}+D_{j2}$ of the point multiplication result $D_{i2}$ and the point multiplication result $D_{j2}$ based on the elliptic curve algorithm, and calculating, by the vehicle Vj, an accident report verification parameter $c_{j2}=SK_{Vj}+h(D1\|D2\|D_{ij}\|T_1\|PID_i\|T_2\|PID_j\|VaI_i\|VaI_j)*d_{j2}$; and sending, by the vehicle Vj, an signed accident report $M_{j2}=\{c_{j2}, PID_i, VaI_i, PID_j\}$ to the vehicle Vi;

sub-step 3.5, after the vehicle Vi receives the signed accident report $M_{j2}$ from the vehicle Vj, calculating, by the vehicle Vi, a sum $c_{ij}=c_{j2}+c_{i2}$ of the accident report verification parameter $c_{j2}$ and the accident report verification parameter $c_{i2}$, then verifying correctness of a point multiplication result $c_{ij} \cdot P = PK_{Vj}+PK_{Vi}+h(D1\|D2\|D_{ij}\|T_1\|PID_i\|T_2\|PID_j\|VaI_i\|VaI_j)D_{ij}$ of the sum $c_{ij}$ based on the elliptic curve algorithm, and when the point multiplication result $c_{ij}P$ is correct, determining that the corresponding accident reports are signed by the vehicle Vi and the vehicle Vj; and sub-step 3.6, after the vehicle Vj receives the signed accident report $M_{i2}$ from the vehicle Vj, calculating, by the vehicle Vj, the sum $c_{ij}=c_{j2}+c_{i2}$ of the accident report verification parameter $c_{j2}$ and the accident report verification parameter $c_{i2}$, then verifying correctness of the point multiplication result $c_{ij} \cdot P = PK_{Vj}+PK_{Vi}+h(D1\|D2\|D_{ij}\|T_1\|PID_i\|T_2\|PID_j\|VaI_i\|VaI_j)D_{ij}$ of the sum $c_{ij}$ based on the elliptic curve algorithm, and when the point multiplication result $c_{ij}P$ is correct, determining that the corresponding accident reports are signed by the vehicle Vi and the vehicle Vj;

step S4, uploading, by the road side unit, accident information Tx to the blockchain after the road side unit identifies the vehicle Vi and the vehicle Vj; and wherein the uploading comprises:

sub-step S4.1, sending, by the vehicle Vi, a message $M1=\{PID_i, b_i, PK_{Vi}, A_i, PID_j, b_j, PK_{Vj}, A_j\}$ to the road side unit, and the message M1 comprising a parameter set;

sub-step S4.2, after the road side unit receives the message M1, verifying, by the road side unit, correctness of a point multiplication result $(b_i+b_j) \cdot P = (h(PID_i\|PK_{Vi}\|A_i)+h(PID_j\|PK_{Vj}\|A_j)) PK_{TA}+(A_i+A_j)$ of a sum of the identity-verification parameter $b_i$ and the identity-verification parameter $b_j$ based on the elliptic curve algorithm; and when the point multiplication result $(b_i+b_j) \cdot P$ is correct, sending, by the road side unit, a message $M2=\{RID_t, y_t, Z_t, PK_{Rt}\}$ to the vehicle Vi;

sub-step S4.3, after the vehicle Vi receives the message M2, verifying, by the vehicle Vi, correctness of a point multiplication result $y_t \cdot P = h(RID_t\|PK_{Rt}\|Z_t)PK_{TA}+Z_t$ of the identity-verification parameter $y_t$ of the road side unit based on the elliptic curve algorithm; and when the point multiplication result $y_t \cdot P$ is correct, sending, by the vehicle Vi, a message $M3=\{c_{ij}, PK_{Vi}, PK_{Vj}, D1, D2, D_{ij}, T_1, PID_i, T_2, PID_j, VaI_i, VaI_j\}$ to the road side unit; and sub-step S4.4, after the road side unit receives the message M3, verifying, by the road side unit, correctness of a point multiplication result $c_{ij} \cdot P = PK_{Vj}+PK_{Vi}+h(D1\|D2\|D_{ij}\|T_1\|PID_i\|T_2\|PID_j\|VaI_i\|VaI_j)D_{ij}$ of the sum $c_{ij}$ based on the elliptic curve algorithm; and when the point multiplication result $c_{ij} \cdot P$ is correct, selecting, by the road side unit, a random number $d_t$ and calculating a point multiplication result $D_t=d_t \cdot P$ of the random number $d_t$ based on the elliptic curve algorithm, generating a signature parameter $c_t=SK_{Rt}+h(c_{ij}\|T_3\|D_t)d_t$ by the road side unit, $T_3$ of the signature parameter $c_t$ representing a time stamp, and unloading, by the road side unit, the accident information $Tx=\{c_{ij}, PK_{Vi}, PK_{Vj}, D1, D2, Dij, T_1, PID_i, T_2, PID_j, VaI_i, VaI_j, RID_t, PK_{Rt}, T_3, c_t, D_t\}$ to the blockchain; and step S5, updating, by the vehicle Vi, a temporary identity to prevent identity tracking attacks, and wherein the updating comprises:

sub-step S5.1, inputting, by the driver of the vehicle Vi, the biological information $Bio_i$ of the driver of the vehicle Vi to the vehicle Vi; recovering, by the vehicle Vi, the biological key $\sigma_i=Rep(Bio_i, \tau_i)$, calculating the login-verification parameter $V_i=h(\sigma_i\|VaI_i)$, and verifying the correctness of the login-verification parameter $V_i=h(\sigma_i\|VaI_i)$; and when $Vi \neq h(\sigma_i\|VaI_i)$, determining that the login-verification parameter $V_i=h(\sigma_i\|VaI_i)$ is wrong, otherwise decrypting, by the vehicle Vi, the random number $r_i=S_{i3} \oplus h(VID_i\|\sigma_i)$;

sub-step 5.2, reselecting, by the vehicle Vi, a random number $SK_{Vi}*$ as a private key; and generating a time stamp $T_4$, calculating a point multiplication result $PK_{Vi}*=SK_{Vi}* \cdot P$ of the random number $SK_{Vi}*$ based on the elliptic curve algorithm, and the point multiplication result $PK_{Vi}*$ representing a public key; encrypting, by the vehicle Vi, a message $M_1=E_{r_i}(VID_i, PK_{Vi}*, PID_i, T_4)$, and sending, by the vehicle Vi, a first message set $\{PID_i, M_1, T_4\}$ to the trust authority for an update request;

sub-step 5.3, after the trust authority receives the update request, verifying, by the trust authority, freshness of the time stamp $T_4$, when the freshness of the time stamp $T_4$ passes a verification of the trust authority, decrypting, by the trust authority, the message $M_1$ by $(VID_i, VaI_i, r_i)=D_{K_{TA}}(PID_i)$ and $(VID_i*, PK_{Vi}*, PID_i*, T_4*)=D_{r_i}(M_1)$; verifying, by the trust authority, equations $VID_i*=VID_i$, $PID_i*=PID_i$, and $T_4*=T_4$; when the equations hold, generating, by the trust authority, a random number $r_i*$ and a random number $a_i^*$; calculating, by the trust authority, a point multiplication result $A_i^*=a_i^* \cdot P$ of the random number $a_i^*$ based on the elliptic curve algorithm; calculating, by the trust authority, a pseudonym $PID_i^*=E_{K_{TA}}(VID_i\|VaI_i\|r_i^*)$ of the vehicle Vi; calculating, by the trust authority, an identity-verification parameter $b_i^*=h(PID_i^*\|PK_{Vi}^*\|A_i^*)*SK_{TA}+a_i^*$ of the vehicle Vi; generating, by the trust authority, a time stamp $T_5$; calculating a message $M_2=E_{r_i}(VID_i, A_i^*, PID_i^*, b_i^*, r_i^*, T_5)$, and sending a second message set $\{PID_i, M_2, T_5\}$ to the vehicle Vi; and sub-step S5.4, after the vehicle Vi receives the second message set $\{PID_i, M_2, T_5\}$, verifying, by the vehicle Vi, freshness of the time stamp $T_5$; when the freshness of the time stamp $T_5$ passes a verification of the vehicle Vi, decrypting, by the vehicle Vi, the message $M_2$ by $(VID_i^{**}, A_i^*, PID_i^*, b_i^*, T_5^*)=D_{r_i}(M_2)$; verifying, by the vehicle Vi, correctness of a point multiplication result $b_i^* \cdot P=h(PID_i^*\|PK_{Vi}^*\|A_i^*)*PK_{TA}+A_i^*$ of the identity-verification parameter $b_i^*$ based on the elliptic curve algorithm; when the point multiplication result $b_i^* \cdot P$ is correct, $VID_i^{**}=VID_i$, and $T_5^*=T_5$, calculating, by the vehicle Vi, a login-verification parameter $V_i^*=h(\sigma_i\|VaI_i)$, $S_1^*=b_i^* \oplus h(\sigma_i\|V_i)$ used to encrypt and store the identity-verification parameter $b_i^*$, $S_{i2}^*=SK_{Vi}^* \oplus h(V_i\|\sigma_i)$ used to encrypt and store the long-term private key $SK_{Vi}^*$, and $S_{i3}^*=r_i^* \oplus h(VID_i\|\sigma_i)$ used to encrypt and store the random number $r_i^*$; and replacing, by the vehicle Vi, the registration information $\{P, V_i, S_{i1}, S_{i2}, S_{i3}, A_i, PK_{Vi}, PK_{TA}, PID_i, Rep(\bullet), VaI_i, \tau_i\}$ of the vehicle Vi stored in the on-board circuit with $\{P, V_i, S_{i1}^*, S_{i2}^*, S_{i3}^*, A_i^*, PK_{Vi}^*, PK_{TA}, PID_i^*, Rep(\bullet), VaI_i, \tau_i\}$.

2. The traffic accident forensics method based on the blockchain as claimed in claim 1, wherein a time stamp is verified by $|T_n'-T_n| \leq \Delta T$, where $T_n$ represents a time stamp contained in a target message, and $T_n'$ represents a current time stamp when a device receives the target message, and $\Delta T$ represents a preset threshold time allowed in a communication process; when a time difference between $T_n$ and $T_n'$ exceeds the preset threshold time, verification of the time stamp is terminated; when the time difference between $T_n$ and $T_n'$ does not exceeds the preset threshold time, a next step to the verification of the time stamp is performed.

3. The traffic accident forensics method based on the blockchain as claimed in claim 1, wherein the accident report $M_{i1}$, the accident report $M_{j1}$, the signed accident report $M_{i2}$, the signed accident report $M_{j2}$, the message $M_1$, the message $M_2$, and the message $M_3$ are transmitted within a common channel.

* * * * *